US012472065B1

(12) United States Patent
Gutierrez et al.

(10) Patent No.: US 12,472,065 B1
(45) Date of Patent: Nov. 18, 2025

(54) SYSTEMS AND METHODS OF SHOULDER IMPLANT SURGICAL GUIDE

(71) Applicant: Acromio Tech, LLC, Tampa, FL (US)

(72) Inventors: Sergio Gutierrez, Tampa, FL (US); Brian Badman, Zionsville, IN (US)

(73) Assignee: Acromio Tech, LLC, Tampa, FL (US)

( * ) Notice: Subject to any disclaimer, the term of this patent is extended or adjusted under 35 U.S.C. 154(b) by 0 days.

(21) Appl. No.: 18/961,206

(22) Filed: Nov. 26, 2024

(51) Int. Cl.
*A61F 2/40* (2006.01)
*A61F 2/30* (2006.01)
*A61F 2/46* (2006.01)

(52) U.S. Cl.
CPC ............ *A61F 2/30721* (2013.01); *A61F 2/40* (2013.01); *A61F 2002/4627* (2013.01)

(58) Field of Classification Search
CPC . A61F 2/40; A61F 2/30721; A61F 2002/4627
See application file for complete search history.

(56) References Cited

U.S. PATENT DOCUMENTS

| | | | | |
|---|---|---|---|---|
| 7,780,451 | B2* | 8/2010 | Willobee | G09B 23/32 434/267 |
| 11,103,258 | B2* | 8/2021 | Bahk | A61B 17/15 |
| 11,576,690 | B2* | 2/2023 | Bahk | A61B 17/1728 |
| 2008/0114460 | A1* | 5/2008 | Willobee | G09B 23/32 623/19.13 |
| 2015/0025630 | A1* | 1/2015 | Euteneuer | A61F 2/0811 623/13.13 |
| 2021/0137539 | A1* | 5/2021 | Bahk | A61F 2/30767 |
| 2022/0039811 | A1* | 2/2022 | Bahk | A61F 2/30767 |

OTHER PUBLICATIONS

Wirth MA, Butters KP, Rockwood CA Jr. The posterior deltoid-splitting approach to the shoulder. Clin Orthop Relat Res. Nov. 1993;(296):92-8. PMID: 8222457. (Year: 1993)*

* cited by examiner

*Primary Examiner* — Zade Coley
(74) *Attorney, Agent, or Firm* — Foley & Lardner LLP

(57) ABSTRACT

The surgical apparatus can include a guide body including a guide track, a guide block coupled to and movable along the guide track and defining an aperture, a first supporting member comprising one or more first engagement features attachable to an inferior portion of an acromion bone, a second supporting member comprising one or more second engagement features attachable to a first superior portion of the acromion bone, and a third supporting member comprising one or more third engagement features attachable to a second superior portion of the acromion bone. The surgical apparatus can include a delivery member extending through the aperture, the delivery member extending and movable along a delivery member axis extending above the first supporting member where at least one of the first supporting member, the second supporting member, and the third supporting member are adjustable.

14 Claims, 13 Drawing Sheets

SYSTEMS AND METHODS OF SHOULDER IMPLANT SURGICAL GUIDE

TECHNICAL FIELD

The present disclosure relates generally to surgical apparatuses.

BACKGROUND

Shoulder implant surgery can be performed to replace parts of a shoulder joint with metallic implants to relieve pain and restore mobility in the shoulder joint. However, it may be difficult to align the implant due to variations in anatomy. Metallic implants may also cause complications, such as residual pain and displacement within the shoulder.

SUMMARY

At least one aspect of the present disclosure is directed towards an apparatus, such as a surgical apparatus. The surgical apparatus can include a guide body including a guide track, a guide block coupled to and movable along the guide track and defining an aperture, a first supporting member including one or more first engagement features attachable to an inferior portion of an acromion bone, a second supporting member including one or more second engagement features attachable to a first superior portion of the acromion bone, and a third supporting member including one or more third engagement features attachable to a second superior portion of the acromion bone. The surgical apparatus can also include a delivery member extending through the aperture, the delivery member extending and movable along a delivery member axis extending above the first supporting member where at least one of the first supporting member, the second supporting member, and the third supporting member are adjustable.

In some embodiments, the second supporting member and the third supporting member are adjustable. The guide body can further include a first supporting member track including a first ratchet, a second supporting member track including a second ratchet, and a supporting member adjuster coupled to the first ratchet and the second ratchet where the second supporting member and the third supporting member are coupled to the first supporting member track and the second supporting member track, respectively, and are adjustable via the supporting member adjuster. In some embodiments, the second supporting member and the third supporting member are independently adjustable. In some embodiments, the aperture is a first aperture and the guide block defines a second aperture, the surgical apparatus further including a guide rod extending through the second aperture, the guide rod including a first portion extending along a first guide rod axis offset from the delivery member axis, a second portion contiguous with the first portion, a guide marker coupled to the second portion and extending along a second guide rod axis, and a fastener coupled to the second portion.

In some embodiments, the second guide rod axis extends at an angle between 70 to 120 degrees, inclusive, relative to the first guide rod axis, the guide marker movable along the second guide rod axis. In some embodiments, the fastener is a first fastener, the surgical apparatus further including a second fastener coupled to the guide block and in contact with the first portion and a third fastener coupled to the guide track and in contact with the delivery member. The delivery member can be configured to move between a first angle and a second angle about the delivery member axis. The surgical apparatus can also include a guide wire extending through the delivery member, the guide wire extending and movable along the delivery member axis. The delivery member can be a first delivery member, the surgical apparatus further including a second delivery member removably extendable through the first delivery member, the second delivery member extending and movable along the delivery member axis, wherein the second delivery member is coupled to at least one of an implant insertable into a scapula bone or a drill bit, the implant being cannulated or solid.

In some embodiments, the implant has an outer diameter between 1.5 to 25 mm, inclusive, an inner diameter between 0.3 to 20 mm, inclusive, and a length between 15 to 300 mm, inclusive. The implant can include a first portion and a second portion, the second portion contiguous with the first portion and extending from the first portion at an angle between 0.5 to 45 degrees, inclusive. The implant includes a plurality of engagement features, the plurality of engagement features located along a length of the implant and equally spaced apart by a distance of between 2 to 150 mm, inclusive.

In some embodiments, the surgical apparatus further includes a first handle coupled to the first delivery member, the first delivery member movable by the first handle and a second handle coupled to the second delivery member and in contact with the first handle, the second delivery member movable by the second handle. At least one of the first handle or the second handle can also include gripping features. The first superior portion of the acromion bone can be a posterior superior lateral portion of the acromion bone and the second superior portion is an anterior superior central to central third portion of the acromion bone.

Another aspect of the present disclosure is directed towards a method. The method can include making a lateral incision on a posterolateral side of an acromion bone, splitting the lateral incision through a deltoid muscle, attaching to the acromion bone, a surgical apparatus including a guide body including a guide track, a guide block coupled to and movable along the guide track and defining an aperture, a first supporting member including one or more first engagement features, a second supporting member including one or more second engagement features, and a third supporting member including one or more third engagement features. The surgical apparatus can also include a delivery member extending through the aperture, the delivery member extending and movable along a delivery member axis extending above the first supporting member, where the first supporting member engages with an inferior portion of the acromion bone, the second supporting member engages with a first superior portion of the acromion bone, and the third supporting member engages with a second superior portion of the acromion bone. The method further includes drilling a cavity in a lateral portion of the acromion bone, inserting an implant into the cavity via the delivery member, the implant flush to the lateral portion of the acromion bone, and detaching the surgical apparatus from the acromion bone.

In some embodiments, the method further includes extending a guide rod of the surgical apparatus towards a scapula spine bone and adjusting the guide rod to contact skin above the scapula spine bone and align the surgical apparatus. The guide rod can extend along a guide rod axis offset from the delivery member axis. The method can further include inserting a guide wire into the delivery member, drilling the guide wire into the lateral portion of the acromion bone towards a scapula spine bone, and withdrawing the guide wire from the cavity following insertion of the implant where the cavity is drilled along the guide wire and the implant is inserted around the guide wire. To attach the surgical apparatus, the first supporting member can be placed into contact with the inferior portion of the acromion bone, and the second supporting member and the third supporting member are adjusted to contact a posterior superior portion of the acromion bone and an anterior superior portion of the acromion bone, respectively. The second supporting member and the third supporting member can be independently adjusted. The second supporting member and the third supporting member can be coupled by a supporting member adjuster, the second supporting member and the third supporting member adjustable by the supporting member adjuster. To detach the surgical apparatus from the acromion bone, the delivery member can be withdrawn and the second supporting member and the third supporting member are adjusted.

In some embodiments, the delivery member is a first delivery member and the surgical apparatus further comprises a second delivery member located within the first delivery member, the method further including attaching a drill bit to the second delivery member prior to drilling the cavity and attaching the implant to the second delivery member prior to inserting the implant. To move the second delivery member and the first delivery member to insert the implant, the surgical apparatus further includes a first handle to move the first delivery member and a second handle to move the second delivery member. The first superior portion of the acromion bone can be a posterior superior lateral portion of the acromion bone and the second superior portion is an anterior superior central to central third portion of the acromion bone.

Another aspect of the present disclosure is directed towards a kit. The kit can include an implant and a surgical apparatus including a guide body including a guide track, a guide block coupled to and movable along the guide track and defining an aperture, a first supporting member comprising one or more first engagement features attachable to an inferior portion of an acromion bone, a second supporting member comprising one or more second engagement features attachable to a first superior portion of the acromion bone, and a third supporting member comprising one or more third engagement features attachable to a second superior portion of the acromion bone. The surgical apparatus can further include a delivery member extending through the aperture, the delivery member extending and movable along a delivery member axis extending above the first supporting member where at least one of the first supporting member, the second supporting member, and the third supporting member are adjustable.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
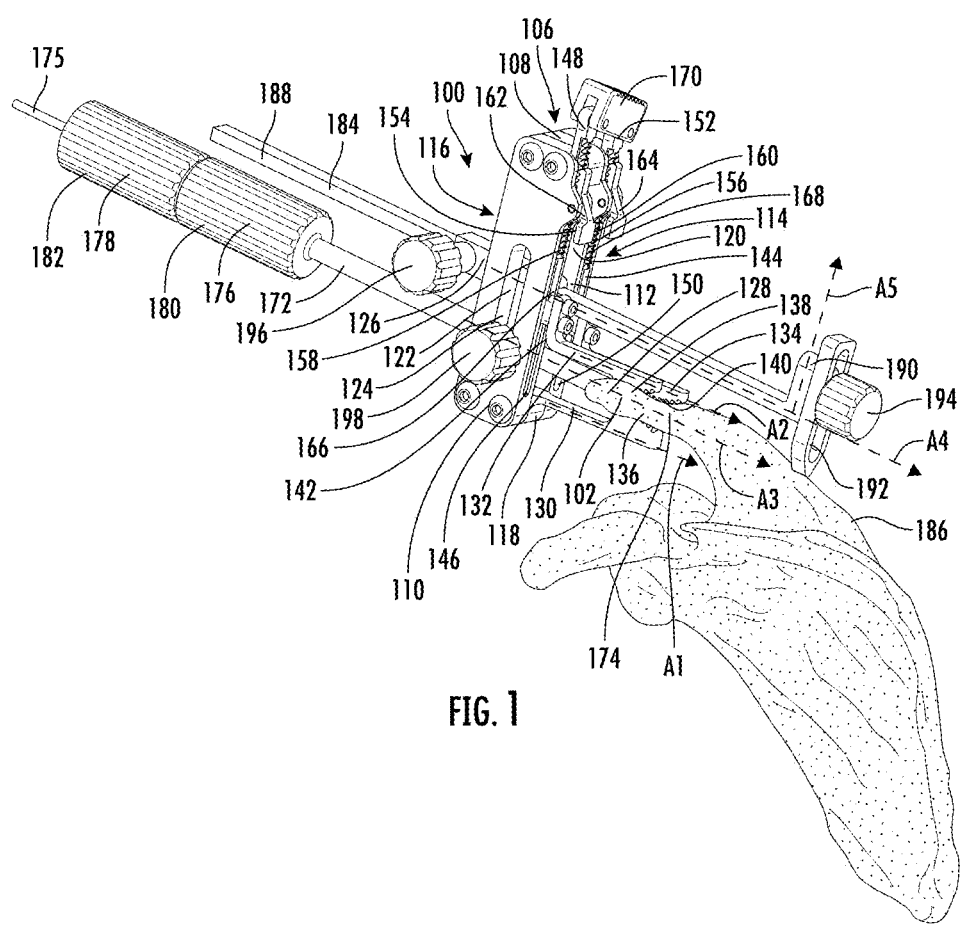
FIG. 1 is a perspective view of an example surgical apparatus on an acromion bone.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations can be utilized, and other changes can be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Following below are more detailed descriptions of various concepts related to, and implementations of a surgical apparatus. The various concepts introduced above and discussed in greater detail below can be implemented in any of a number of ways, as the described concepts are not limited to any particular manner of implementation. Examples of specific implementations and applications are provided primarily for illustrative purposes.

I. Overview

Acromial fractures (e.g., fractures in the acromion bone) may occur following surgery, such as a post shoulder arthroplasty. For example, acromial fractures may occur following reverse shoulder replacement. Those with fractures may experience pain and limited motion in the shoulder and/or arm. Acromial fracture treatment options may be limited and challenging. For example, acromial fractures can be treated non-surgically, such as with physical therapy or pain relievers as well as surgically, such as with internal fixation, bone grafting, or arthroscopic surgery. However, even with treatment, there is a risk of nonunion (e.g., fracture failing to heal properly), infection, hardware issues (e.g., irritation caused by plates and screws used for internal fixation), and residual pain. Furthermore, treating the acromion bone is difficult due to various morphologies per person, making implant insertion difficult. For example, accurately inserting a bone screw flush to a lateral portion of the acromion bone to achieve internal fixation of the acromion may be difficult due to the different morphologies of the acromion bone.

The systems and methods as described herein provide a surgical guide to accurately align an implant to be inserted prior to performing shoulder surgery, such as reverse shoulder replacement. The implant may reinforce the acromion bone to mitigate a risk of acromial fractures. The surgical guide aligns the implant with the lateral portion of the acromion bone, and can facilitate, for example, a surgeon in quickly and accurately aligning the implant for insertion into the acromion bone. The surgical guide may adapt to any morphology of the acromion bone, and enable angular movement and guidance to precisely align the implant with the lateral portion of the acromion bone.

Implementations herein are directed towards a surgical apparatus to guide alignment and insertion of an implant. The surgical apparatus can attach onto the acromion bone to allow for centering of a guide wire to insert the implant along. The surgical apparatus can also include a guide rod to ensure optimal positioning of the implant into the acromial bone. The implant may be placed prior to an acromial fracture occurring and may provide additional calcium and strength to the shoulder. For example, the implant may have a composition matching the acromion bone, minimizing irritation (e.g., compared to metallic implants) and enabling bone ingrowth.

The surgical apparatus can include a first supporting member, a second supporting member, and a third supporting member to attach to the acromion bone. The surgical apparatus can be attached following the making of a lateral incision along a posterolateral side of the acromion bone. Once the surgical apparatus is attached, a guide rod can be extended to align a guide wire of the surgical apparatus with the acromion bone. The surgical apparatus can include a delivery member which a drill bit or the implant can attach to. For example, to create a cavity along the guide wire, the drill bit is attached to the delivery member. Once the cavity is formed, the implant can be attached to the delivery member for insertion into the cavity. The implant may be inserted flush to a lateral portion of the acromion. The surgical apparatus can then be detached from the acromion bone following insertion of the implant.

III. Overview of a Surgical Guide for Shoulder Implant Surgery

Figure 2:
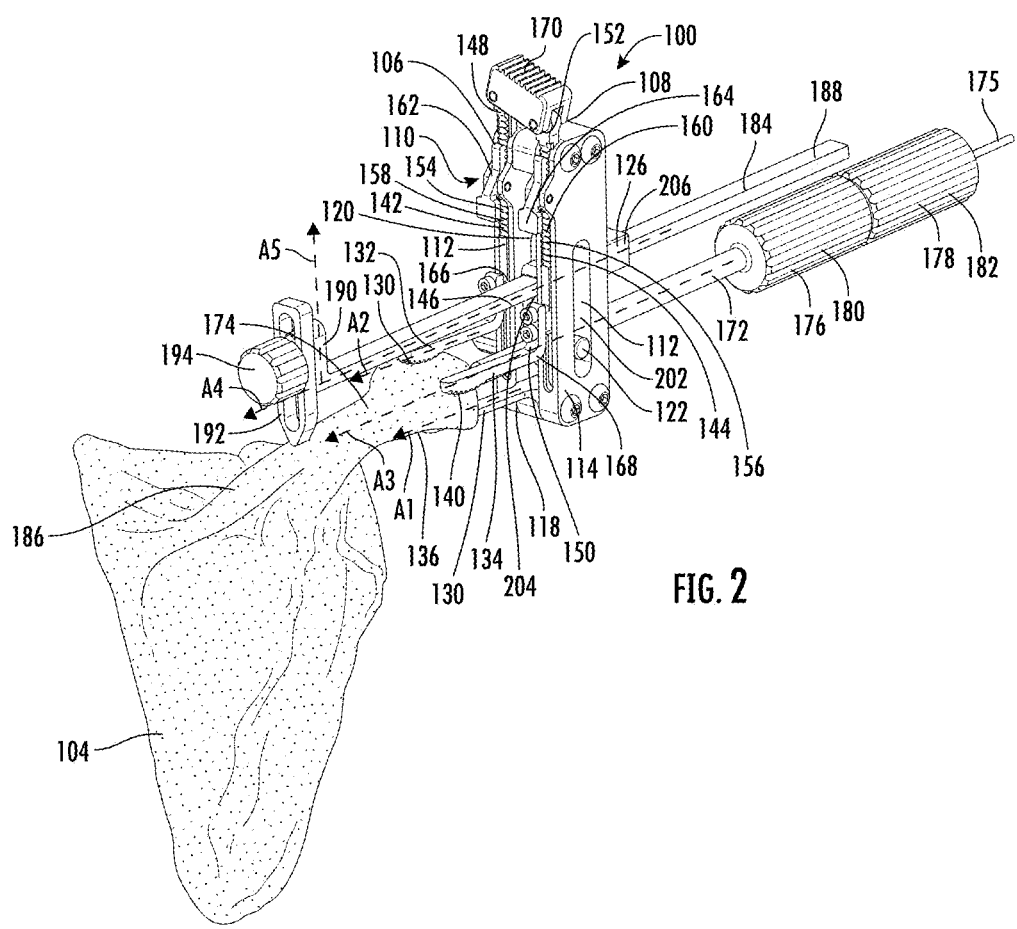
FIG. 2 is another perspective view of the surgical apparatus on the acromion bone.

FIGS. 1-9 show various views of an example of a surgical apparatus 100 (e.g., an implant guide apparatus, a shoulder implant guide apparatus, surgical guide). The surgical apparatus 100 can be used to guide and align an implant to be inserted into an acromion bone 102 of a patient. As shown in FIGS. 1-2, the surgical apparatus 100 can attach to the acromion bone 102. The acromion bone 102 is a part of a scapula bone 104.

The surgical apparatus 100 can include a guide body 106 (e.g., guide structure, support frame, guide assembly). The guide body 106 can include one or more walls. The guide body 106 can include a top wall 108, a first lateral wall 110, a second lateral wall 112, a third lateral wall 114, a fourth lateral wall 116, and a bottom wall 118. The first lateral wall 110, the second lateral wall 112, the third lateral wall 114, and the fourth lateral wall 116 can be contiguous with each other, as well as with the top wall 108 and the bottom wall 118. The guide body 106 can have a rectangular shape. The guide body 106 defines an aperture 120. The aperture 120 is located or formed between the top wall 108, the first lateral wall 110, the second lateral wall 112, the third lateral wall 114, the fourth lateral wall 116, and the bottom wall 118. The aperture 120 can extend through the second lateral wall 112 and the fourth lateral wall 116.

The guide body 106 can include a guide track 122. The guide track 122 can include a first portion 124 and a second portion 202 (as seen in FIG. 2). The first portion 124 can be located on the first lateral wall 110 while the second portion 202 is located on the third lateral wall 114. A length of both the first portion 124 and the second portion 202 can be less than a length of the first lateral wall 110 and the third lateral wall 114, respectively. The first portion 124 and the second portion 202 may be apertures defined by the first lateral wall 110 and the third lateral wall 114. Both the first portion 124 and the second portion 202 can have a length between 40 to 70 mm, inclusive.

The guide body 106 can include a guide block 126. The guide block 126 is located in the aperture 120 and between the first lateral wall 110 and the third lateral wall 114. The guide block 126 can be coupled to and movable along the guide track 122. For example, the guide block 126 can move along the length of the first portion 124 and the second portion 202 of the guide track 122. As shown in FIGS. 2-5, the guide block 126 can include a first portion 204 and a second portion 206. The first portion 204 can extend along the guide track 122. The second portion 206 can be contiguous with the first portion 204 and can extend orthogonally from the first portion 204. The second portion 206 can extend away from the guide body 106. For example, the second portion 206 extends through the aperture 120 defined by the fourth lateral wall 116. The guide block 126 can define one or more apertures. The guide block 126 defines a first aperture 302 and a second aperture 304. The first portion 204 can define the first aperture 302 while the second portion 206 defines the second aperture 304. Specifically, the first aperture 302 is located in the first portion 204 while the second aperture 304 is located in the second portion 206. The first aperture 302 can be located below the second aperture 304. A length of the second aperture 304 may be greater than a length of the first aperture 302 as shown in, for example, FIG. 6.

The guide body 106 can include one or more supporting members (e.g., prongs, braces, engagement members). The one or more supporting members can support, attach, secure, or otherwise couple the surgical apparatus 100 to the acromion bone 102. The one or more supporting members can attach to a posterolateral side 128 of the acromion bone 102. The guide body 106 can include, for example, a first supporting member 130, a second supporting member 132, and a third supporting member 134. The first supporting member 130, the second supporting member 132, and the third supporting member 134 can extend from the second lateral wall 112. The first supporting member 130, the second supporting member 132, and the third supporting member 134 can extend orthogonally from the second lateral wall 112. In some embodiments, the first supporting member 130 is coupled to and extends from the bottom wall 118.

Figure 3:
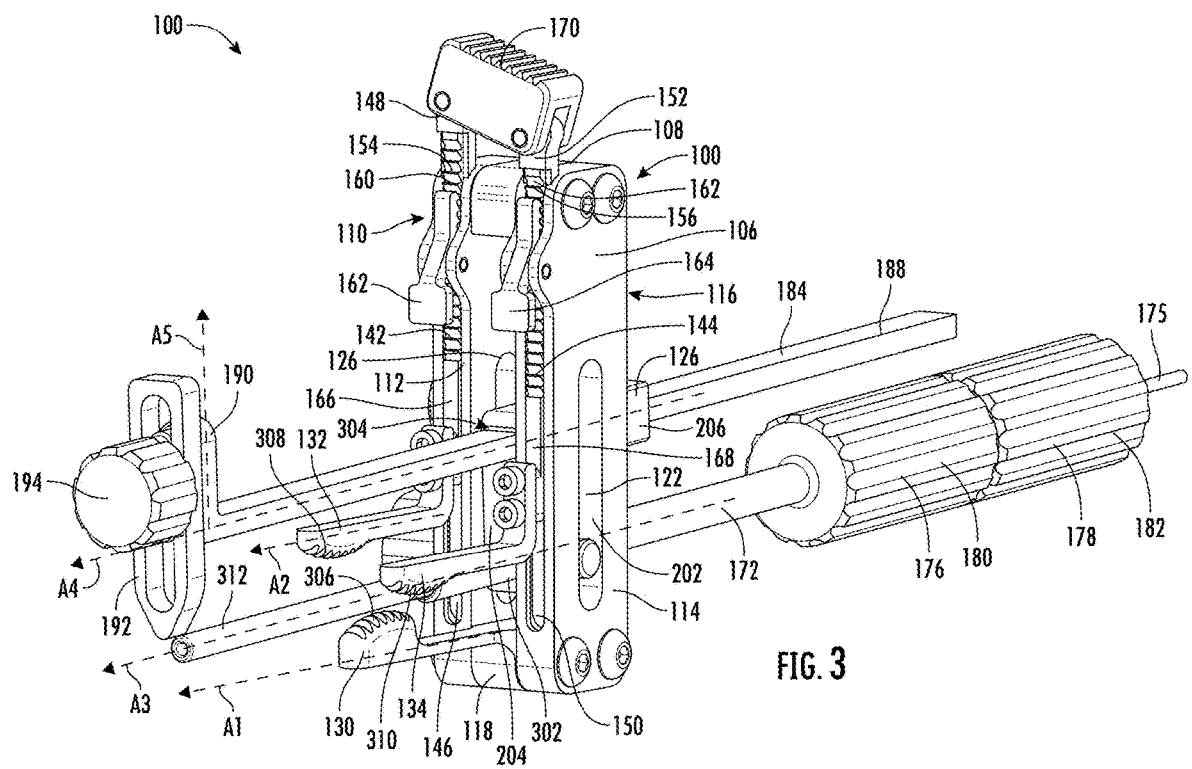
FIG. 3 is another perspective view of the surgical apparatus.

As shown in, for example, FIG. 3, the first supporting member 130 can include one or more first engagement features 306 (e.g., a plurality of teeth, ridges). The one or more first engagement features 306 are attachable to and in contact with an inferior portion 136 of the acromion bone 102. The second supporting member 132 can include one or more second engagement features 308. The one or more second engagement features 308 are attachable to and in contact with a first superior portion 138 of the acromion bone 102. The first superior portion 138 can be a posterior superior lateral portion of the acromion bone 102. The third supporting member 134 can include one or more third engagement features 310. The one or more third engagement features 310 are attachable to and in contact with a second superior portion 140 of the acromion bone 102. The second superior portion 140 can be an anterior superior central to central third portion of the acromion bone 102. The first supporting member 130 can be located below the second supporting member 132 and the third supporting member 134.

Each of the first supporting member 130, the second supporting member 132, and the third supporting member 134 can have a length between 20 to 80 mm, inclusive. Each of the first supporting member 130, the second supporting member 132, and the third supporting member 134 can have a width between 1 to 10 mm, inclusive. A distance between the second supporting member 132 and the third supporting member 134 can be between 10 to 30 mm, inclusive. A distance between the first supporting member 130 and either the second supporting member 132 or the third supporting member 134 can be between 0 to 40 mm, inclusive. The one or more first engagement features 306, the one or more second engagement features 308, and the one or more third engagement features 310 can have a curvature with a radius of 5 to 30 mm, inclusive. For example, the one or more first engagement features 306, the one or more second engagement features 308, and the one or more third engagement features 310 may curve outwardly from the first supporting member 130, the second supporting member 132, and the third supporting member 134, respectively.

At least one of the first supporting member 130, the second supporting member 132, and the third supporting member 134 are adjustable (e.g., movable). At least one of the first supporting member 130, the second supporting member 132, and the third supporting member 134 are adjustable to attach the surgical apparatus 100 to the acromion bone 102. For example, the second supporting member 132 and the third supporting member 134 are adjustable, and the first supporting member 130 is fixed (e.g., not adjustable, immovable). To adjust the second supporting member 132 and the third supporting member 134, the guide body 106 includes one or more supporting member tracks. As shown in, for example, FIG. 2, the guide body 106 can include a first supporting member track 142 and a second supporting member track 144. Both the first supporting member track 142 and the second supporting member track 144 can be located on the second lateral wall 112. The second supporting member 132 can be coupled to the first supporting member track 142. The third supporting member 134 can be coupled to the second supporting member track 144. The first supporting member track 142 includes one or more ends. The first supporting member track 142 include a first end 146 and a second end 148. The second supporting member track 144 includes one or more ends. The second supporting member track 144 includes a first end 150 and a second end 152. The second supporting member 132 can be coupled to the first end 146 while the third supporting member 134 is coupled to the first end 150.

Figure 7:
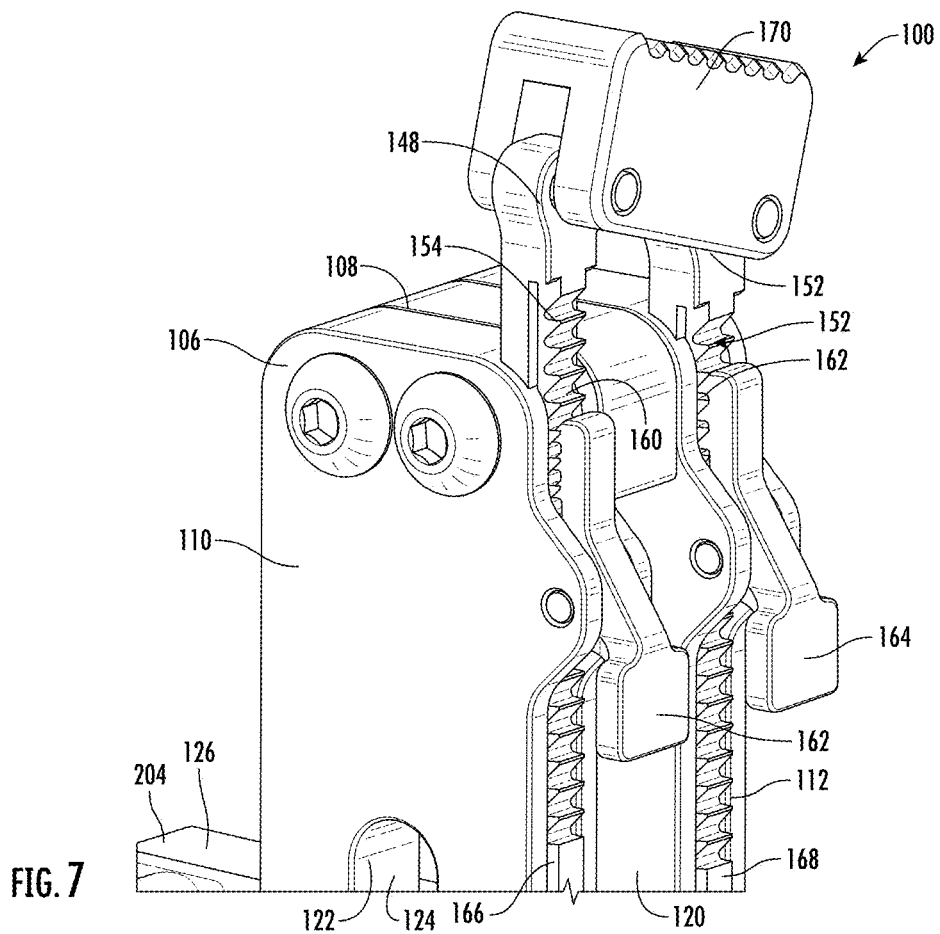
FIG. 7 is a perspective view of a portion of the surgical apparatus.

As seen in, for example, FIG. 7, each of the first supporting member track 142 and the second supporting member track 144 can include a ratchet. The first supporting member track 142 can include a first ratchet 154 and the second supporting member track 144 can include a second ratchet 156. Both the first ratchet 154 and the second ratchet 156 can allow motion of a corresponding supporting member in one direction and restrict motion of the corresponding supporting member in the opposite direction. For example, once the second supporting member 132 comes into contact with the acromion bone 102 and is securely attached (e.g., cannot move further into the acromion bone 102), the first ratchet 154 prevents the second supporting member 132 from detaching from the acromion bone 102. The first ratchet 154 can include a plurality of first steps 158 (e.g., ridges, protrusions, or other engagement features) to enable movement and locking of the second supporting member 132. The second ratchet 156 can include a plurality of second steps 160 (e.g., ridges, protrusions, or other engagement features) to enable movement and locking of the third supporting member 134. Each of the ratchets may include a ratchet stopper. The first ratchet 154 can include a first ratchet stopper 162. The second ratchet 156 can include a second ratchet stopper 164. Both the first ratchet stopper 162 and the second ratchet stopper 164 can impede movement of the second supporting member 132 and the third supporting member 134. Adjustment of the first ratchet stopper 162 and the second ratchet stopper 164 can enable movement of the second supporting member 132 and the third supporting member 134 towards or away from the acromion bone 102. For example, to move the second supporting member 132 away from the acromion bone 102 (e.g., to detach the surgical apparatus 100), the first ratchet stopper 162 can be adjusted.

The second lateral wall 112 can include a first portion 166 and a second portion 168. The first supporting member track 142 can be located on the first portion 166 while the second supporting member track 144 is located on the second portion 168. The first supporting member track 142 extends along a first supporting member track axis A1 while the second supporting member track 144 extends along a second supporting member track axis A2. The first supporting member track axis A1 and the second supporting member track axis A2 are parallel to and offset from each other.

Referring back to FIG. 1, the guide body 106 can also include a supporting member adjuster 170. The supporting member adjuster 170 can be coupled to the first ratchet 154 and the second ratchet 156. The supporting member adjuster 170 can be coupled to the second end 148 and the second end 152. The supporting member adjuster 170 can enable movement of the second supporting member 132 and the third supporting member 134. The supporting member adjuster 170 can have a rectangular shape, and include traction features (e.g., ridges). By adjusting the supporting member adjuster 170, movement of the second supporting member 132 and the third supporting member 134 can be controlled. For example, to move the second supporting member 132 and the third supporting member 134 towards the acromion bone 102, the supporting member adjuster 170 can be pushed towards the acromion bone 102. In this case, the first ratchet stopper 162 and the second ratchet stopper 164 can be adjusted to a position to allow movement of the second supporting member 132 and the third supporting member 134 towards the acromion bone 102.

In some embodiments, the second supporting member 132 and the third supporting member 134 are independently adjustable. In this case, the guide body 106 does not include the supporting member adjuster 170. Instead, the second supporting member 132 and the third supporting member 134 can be directly adjusted. For example, the guide body 106 can include a first adjuster and a second adjuster with the first adjuster coupled to the first supporting member track 142 and the second adjuster coupled to the second supporting member track 144. As another example, the second supporting member 132 and the third supporting member 134 may be moved along the first supporting member track 142 and the second supporting member track 144, respectively, by contacting and applying force to at least one of the second supporting member 132 and the third supporting member 134. In some embodiments, the supporting member adjuster 170 is located above the top wall 108.

The surgical apparatus 100 can include a first delivery member 172 (e.g., cannula, outer cannula, tube). The first delivery member 172 can extend through the first aperture 302 and extend and move along a delivery member axis A3. The delivery member axis A3 can extend above the first supporting member 130. In some embodiments, the delivery member axis A3 extends below and/or between the second supporting member 132 and the third supporting member 134. The first delivery member 172 can also be configured to move between a first angle and a second angle about the delivery member axis A3. The first angle can be −40° while the second angle is 40°. In this case, the guide block 126 can also move between the first angle and the second angle. The first delivery member 172 can have a length of between 50 to 200 mm, inclusive. An inner diameter of the first delivery member 172 can be between 3 to 8 mm, inclusive. An outer diameter of the first delivery member 172 can be between 4.5 to 10 mm.

Figure 4:
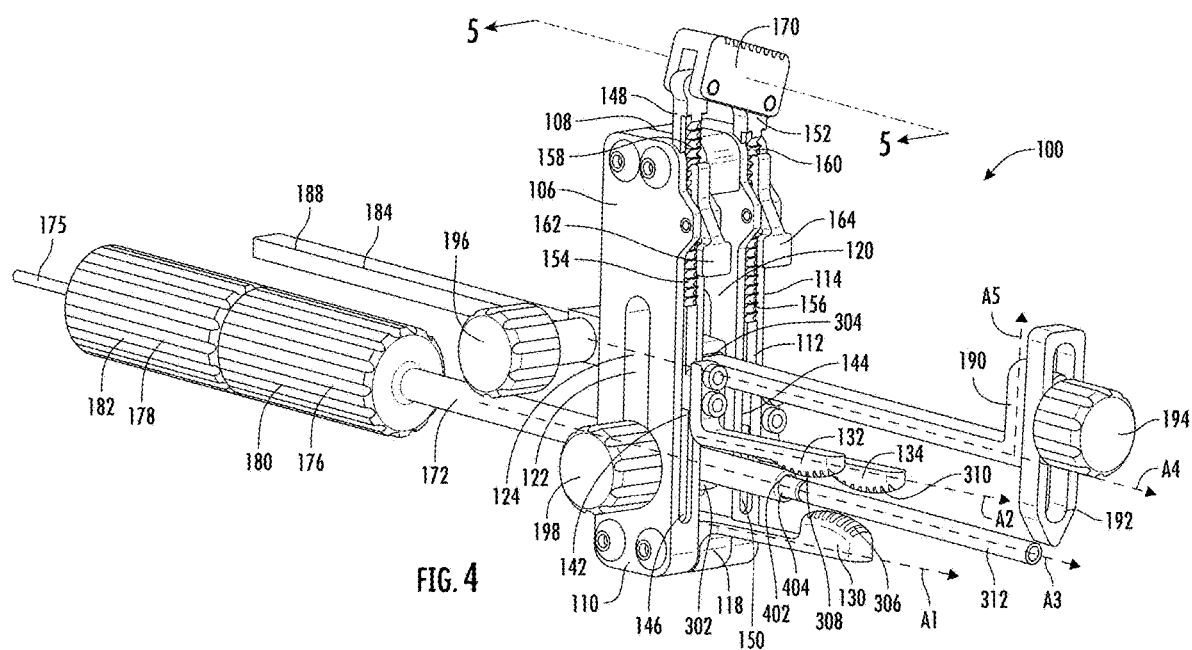
FIG. 4 is another perspective view of the surgical apparatus.
Figure 5:
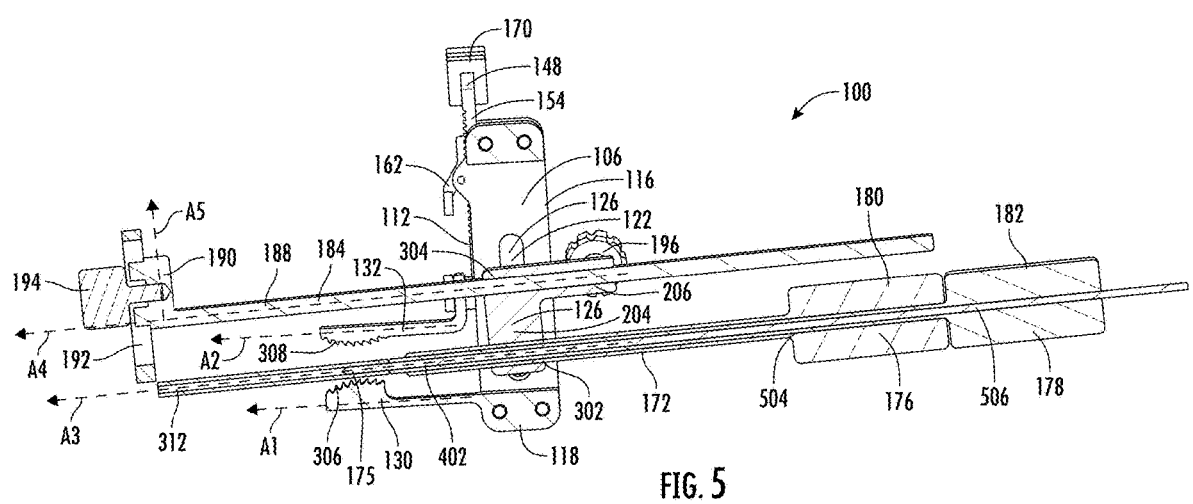
FIG. 5 is a cross-sectional view of the surgical apparatus taken along plane A-A in FIG. 4.
Figure 6:
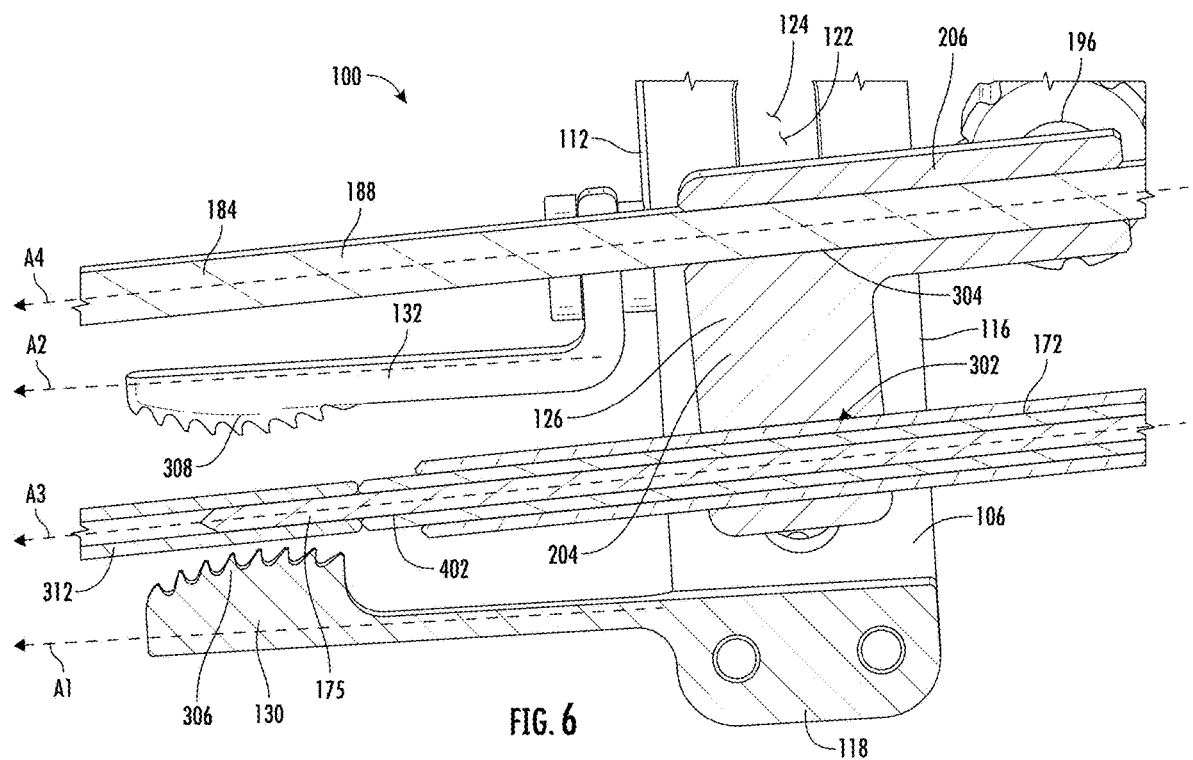
FIG. 6 is a close-up view of the cross-sectional view of the surgical apparatus in FIG. 5.

As shown in, for example, FIGS. 4-6, the surgical apparatus 100 can include a second delivery member 402 (e.g., cannula, inner cannula, tube). The second delivery member 402 can be removably extendable through the first delivery member 172. For example, the second delivery member 402 can extend through and be located in the first delivery member 172. The second delivery member 402 can also extend and move along the delivery member axis A3. The second delivery member 402 can have a length of between 50 to 300 mm, inclusive. An inner diameter of the second delivery member 402 can be between 1 to 4 mm, inclusive. An outer diameter of the second delivery member 402 can be between 3 to 8 mm, inclusive. The outer diameter of the second delivery member 402 can be equal to or less than the inner diameter of the first delivery member 172. A portion 404 of the second delivery member 402 can extend out of the first delivery member 172. The portion 404 can increase or decrease in length as the second delivery member 402 moves along the delivery member axis A3. The delivery member axis A3 may be located between 5 to 15 mm, inclusive away from a center point of at least one of the second supporting member 132 or the third supporting member 134.

As shown in FIG. 3, the surgical apparatus 100 can be attached to an implant 312. The implant 312 can be cannulated (e.g., a tube). The implant 312 can be solid. The implant 312 can have a cylindrical shape. The implant 312 can be composed of a biomaterial and/or a natural material. The implant 312 may also be composed of a metal, ceramic, or a polymer, among others. For example, the implant 312 includes fibers and has a composition (e.g., mineral composition) matching a composition of bone (e.g., the acromion bone 102). The implant 312 can integrate into the acromion bone 102 and increase a calcium composition of the scapula bone 104. As seen in FIG. 4, the implant 312 can be removably coupled to the second delivery member 402. An outer diameter of the implant 312 can be equal to an inner diameter the second delivery member 402. For example, the outer diameter of the implant 312 may be 4 mm. In some embodiments, the outer diameter of the implant 312 is in a range of 1.5 to 25 mm, inclusive. The implant 312 can be coupled to the portion 404. The implant 312 can be inserted into the scapula bone 104 via the acromion bone 102. A length of the implant 312 can be in a range of 15 to 300 mm, inclusive.

Referring now to FIGS. 9-12, the implant 312 can include a plurality of engagement members 902 (e.g., ridges, protrusions). The plurality of engagement members 902 increase friction of the implant 312 upon insertion into the acromion bone 102. For example, the implant 312 may have a frictional fit into a cavity of the implant 312. The plurality of engagement members 902 may provide additional securement of the implant 312 into the acromion bone 102. The plurality of engagement members 902 are located on a first portion 904 of the implant 312. The plurality of engagement members 902 may be equally spaced apart along the first portion 904. The plurality of engagement members 902 may be spaced apart along the first portion 904 at a distance between 2 to 150 mm, inclusive. Each of the plurality of engagement members 902 has a height. The height may be in a range of 0.5 to 20 mm, inclusive. As a result, at points along the first portion 904 including at least one of the plurality of engagement members 902, the outer diameter of the implant 312 increases to be in a range of 1.6 to 26 mm, inclusive.

A second portion 906 of the implant 312 is contiguous with the first portion 904, and a diameter of the second portion 906 decreases as the second portion 906 extends away from the first portion 904. For example, the second portion 906 is tapered. The second portion 906 may extend from the first portion 904 at an angle (e.g., taper angle) of between 0.5 to 45 degrees, inclusive. A length of the first portion 904 is greater than a length of the second portion 906. For example, the length of the second portion 906 can be in a range of 1 to 50 mm, inclusive. The length of the second portion 906 can thus be in a range of 14 to 299 mm, inclusive.

Figure 9:
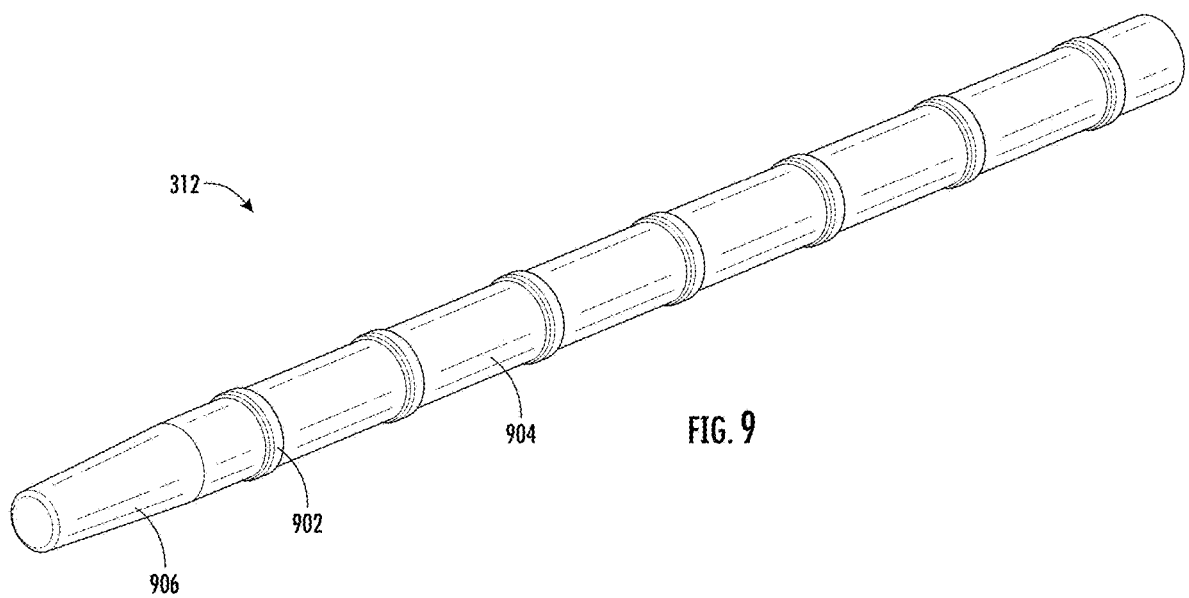
FIG. 9 is a perspective view of an example implant.
Figure 10:
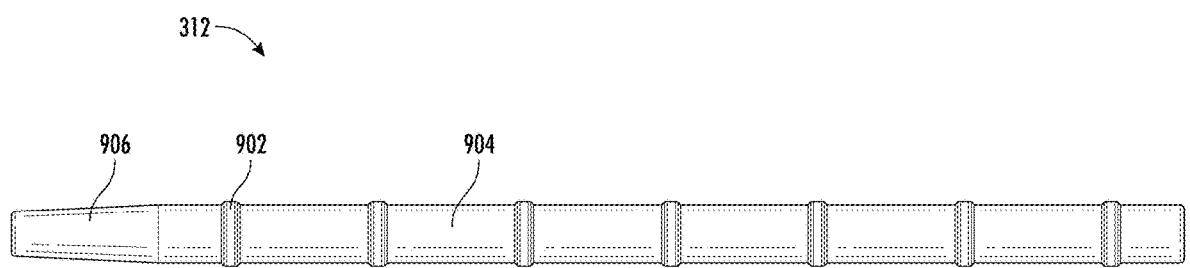
FIG. 10 is a side view of the implant of FIG. 9.
Figure 11:
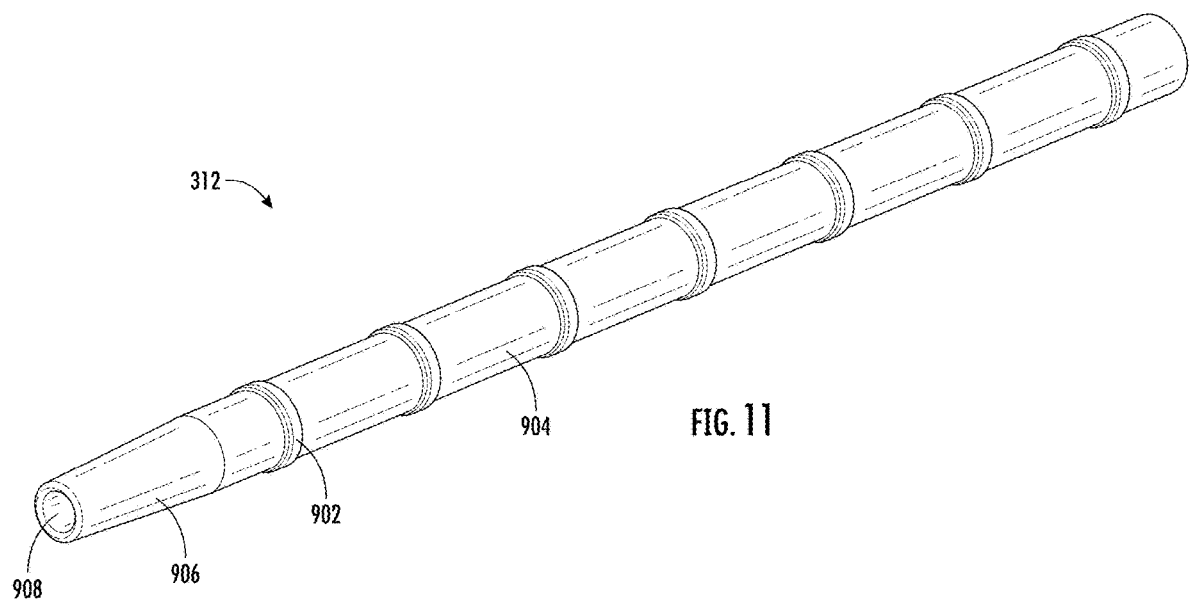
FIG. 11 is a perspective view of another example implant.
Figure 12:
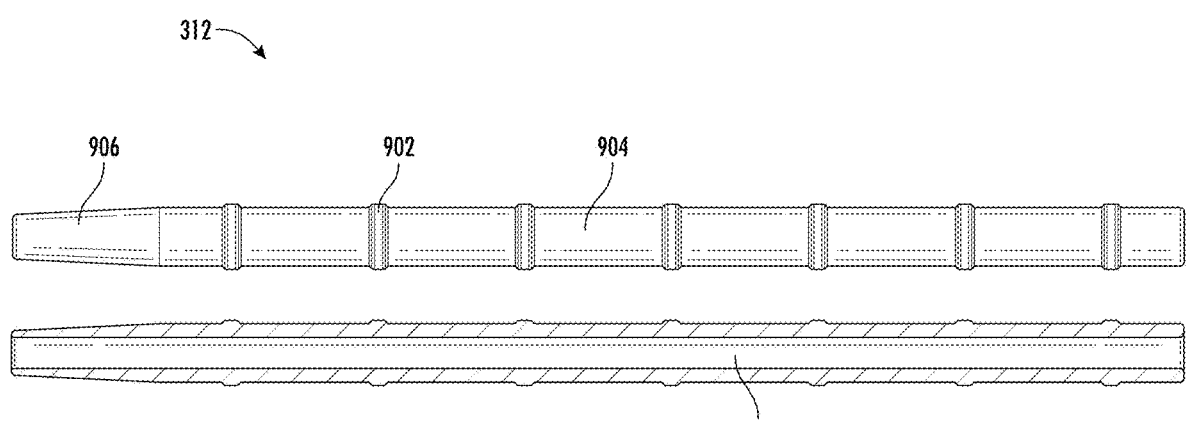
FIG. 12 is a side and cross-sectional view of the implant of FIG. 11.

In some embodiments, as seen in FIGS. 9-10, the implant 312 is solid (e.g., is not cannulated, does not include an apertures). In other embodiments, such as in FIGS. 11-12, the implant 312 is cannulated and defines an aperture 908. The implant 312 extends around the aperture 908. For example, the guide wire 175 may extend through the aperture 908, and the implant 312 may be inserted into a cavity of the acromion bone 102 along the guide wire 175 via the aperture 908. A diameter of the aperture 908 is equal along a length of the implant 312. The diameter of the aperture 908 (e.g., inner diameter of the implant 312) can be in a range of 0.3 to 20 mm, inclusive.

The surgical apparatus 100 can also be coupled to a drill bit (not shown). The drill bit can be removably coupled to the second delivery member 402 to drill a cavity (not shown) into the acromion bone 102. Once made, the implant 312 can be inserted into the cavity. For example, drilling of the cavity can begin at the acromion bone 102 and extend further into the scapula bone 104. The implant 312 can be inserted flush to a lateral portion 174 of the acromion bone 102.

Referring now to FIGS. 5-6, the surgical apparatus 100 can include a guide wire 175. The guide wire 175 can be inserted into the acromion bone 102 to guide drilling of the cavity and insertion of the implant 312. For example, the guide wire 175 can extend through the implant 312. The implant 312 can then be inserted into the cavity around and/or along the guide wire 175. The guide wire 175 can extend through the first delivery member 172. The guide wire 175 can also extend through the second delivery member 402. The guide wire 175 can extend and move along the delivery member axis A3. The guide wire 175 can have a length greater than the first delivery member 172. A diameter of the guide wire 175 can be between 1 to 6 mm. An outer diameter of the guide wire 175 is less than or equal to the inner diameter of the first delivery member 172 and the second delivery member 402.

Referring back to FIG. 1, to move at least one of the first delivery member 172 or the second delivery member 402, the surgical apparatus 100 can include one or more handles. As seen in FIG. 1, the surgical apparatus 100 can include a first handle 176 and a second handle 178. At least one of the first handle 176 and the second handle 178 can include gripping features (e.g., ridges, grooves, treads, traction elements). For example, the first handle 176 includes one or more first gripping features 180 and the second handle 178 includes one or more second gripping features 182. The first handle 176 can be coupled to and move the first delivery member 172. For example, the first delivery member 172 can move and rotate along the delivery member axis A3 in response to movement of the first handle 176. The second handle 178 can be coupled to and move the second delivery member 402. The second delivery member 402 can move and rotate along the delivery member axis A3 in response to movement of the second handle 178. The second handle 178 can be in contact with the first handle 176. The first handle 176 can be located closer to the guide body 106 than the second handle 178.

Each of the first handle 176 and the second handle 178 can define an aperture as seen in FIG. 5. The first handle 176 can define a first aperture 504 while the second handle 178 defines a second aperture 506. The first delivery member 172 can extend through the first aperture 504. The guide wire 175 and the second delivery member 402 can extend through both the first aperture 504 and the second aperture 506. Movement of the guide wire 175 can be independent from movement of the first delivery member 172 and/or the second delivery member 402. Movement of the first delivery member 172 can be independent from movement of the second delivery member 402.

The surgical apparatus 100 can also include a guide rod 184. The guide rod 184 can align the surgical apparatus 100 for insertion of the implant 312. For example, the guide rod 184 can align the surgical apparatus 100 with a scapula spine bone 186 of the scapula bone 104. The guide rod 184 can extend through the second aperture 304 of the guide block 126. The guide rod 184 can include one or more portions. The guide rod 184 can include a first portion 188 extending along a first guide rod axis A4. The first portion 188 can have a length between 250 to 300 mm, inclusive. The first guide rod axis A4 can be offset from the delivery member axis A3. In some embodiments, the first guide rod axis A4 is parallel to and offset from the delivery member axis A3. In some embodiments, the first guide rod axis A4 is angled relative to the delivery member axis A3. The guide rod 184 can also be configured to move between a first angle and a second angle about the first guide rod axis A4. The first angle can be −40° while the second angle is 40°. Adjustment of the guide block 126 (e.g., along the guide track 122) can move both the guide rod 184 and the first delivery member 172. The guide rod 184 can include a second portion 190 contiguous with the first portion 188. The second portion 190 can extend from the first portion 188 at an angle between 70 to 120 degrees, inclusive. For example, the second portion 190 extends orthogonally from the first portion 188.

Figure 8:
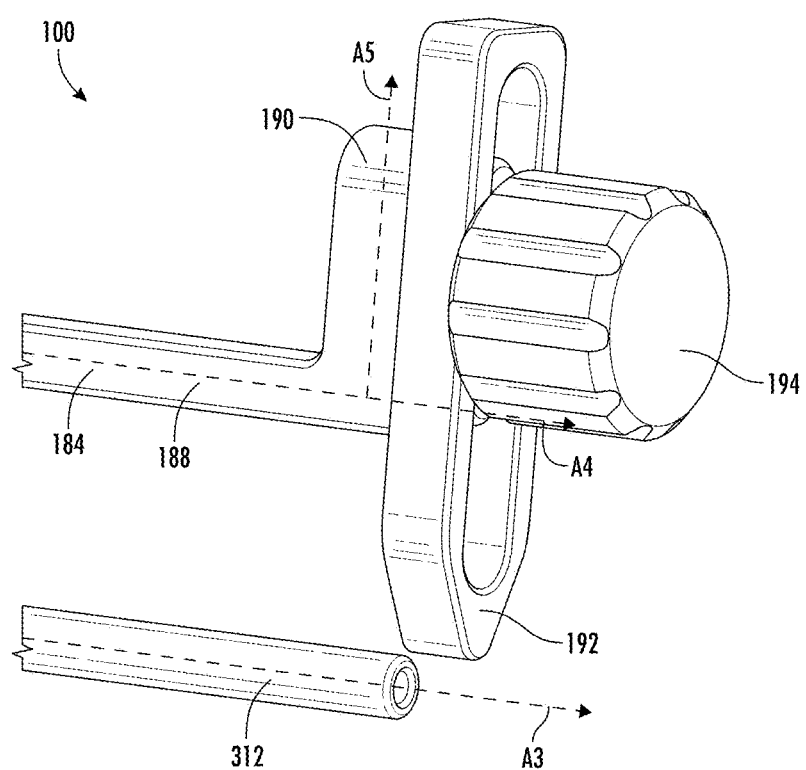
FIG. 8 is a perspective view of a portion of the surgical apparatus.

As seen in, for example, FIG. 8, the guide rod 184 can further include a guide marker 192 (e.g., reference, alignment marker). The guide marker 192 can be coupled to the second portion 190 and extend along a second guide rod axis A5. The second guide rod axis A5 can be at angle between 70 to 120 degrees, inclusive, relative to the first guide rod axis A4. For example, the second guide rod axis A5 extends orthogonally from the first guide rod axis A4. The guide marker 192 can be movable along the second guide rod axis A5. To align the surgical apparatus 100, the guide marker 192 can be moved to contact skin above the scapula bone 104. The guide marker 192 can move between 0 to 30 mm, inclusive, relative to the second portion 190. The guide marker 192 can move towards the scapula bone 104. To adjust and lock a position of the guide marker 192, the guide rod 184 can include a first fastener 194. The first fastener 194 can be coupled to the second portion 190 and extend through the guide marker 192. Adjustment (e.g., rotation) of the first fastener 194 can enable movement of the guide marker 192 along the second guide rod axis A5 and can also secure the position of the guide marker 192 once in contact with the skin above the scapula bone 104. For example, to secure the position of the guide marker 192, the first fastener 194 is tightened.

Referring further to FIG. 1, the surgical apparatus 100 can also include a second fastener 196. The second fastener 196 can be coupled to the guide block 126 and extend to the second aperture 304. The second fastener 196 can be in contact with the first portion 188. The second fastener 196 can enable movement of the guide rod 184 along the first guide rod axis A4. For example, to allow movement of the guide rod 184, the second fastener 196 is loosened by rotation. The second fastener 196 can also lock a position of the guide rod 184. The surgical apparatus 100 can also include a third fastener 198. The third fastener 198 can be coupled to and extend through the guide track 122. The third fastener 198 can be in contact with the first delivery member 172 and enable movement or lock a position of the first delivery member 172. In some embodiments, the third fastener 198 is coupled to the guide block 126 and in contact with the guide track 122.

In some embodiments, the surgical apparatus 100 is manufactured (e.g., made) using 3D printing. For example, the surgical apparatus 100 is composed of at least one of metal, ceramic, or polymer, and is built by using 3D printing. In other examples, the surgical apparatus 100 is manufactured using other types of additive manufacturing (e.g., powder bed fusion), laser cutting, welding, casting, or other methods of manufacturing. The implant 312 may also be additive manufactured (e.g., 3D printing).

Figure 13:
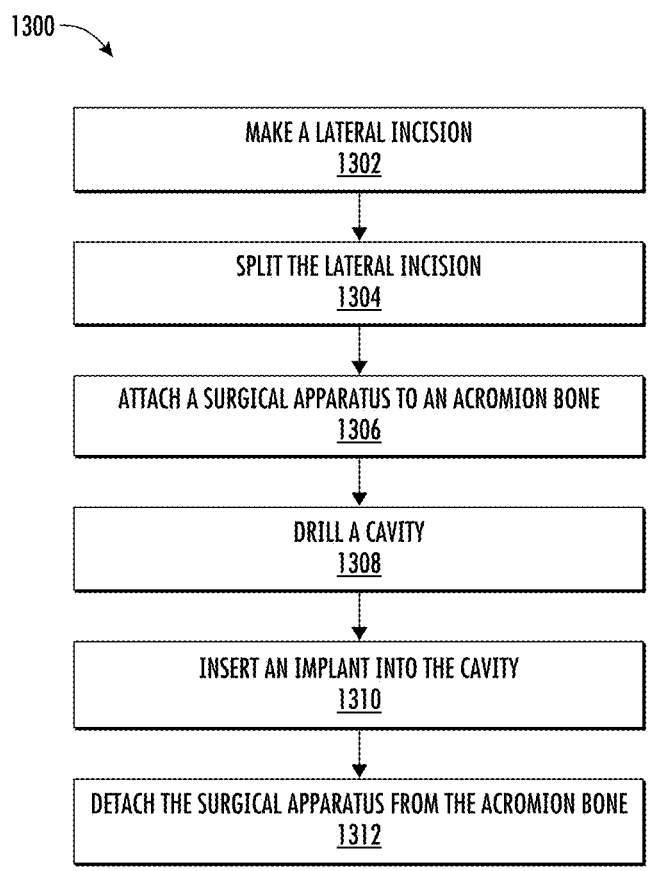
FIG. 13 is a flow diagram of a method for inserting an implant using a surgical apparatus.

FIG. 13 is a block diagram of a method 1300 for attaching an apparatus (e.g., the surgical apparatus 100) to insert an implant (e.g., the implant 312). The method 1300 can be performed with a kit including an implant and a surgical apparatus. The method 1300 or portions thereof can be performed by any of various actors, such as one or more surgeons, physicians, medical professionals, automated or robotic surgical devices, tools, or systems, or various combinations thereof. The method 1300 can be performed as part of an implant insertion procedure. The surgical apparatus can include a guide body (e.g., the guide body 106) and a delivery member (e.g., the first delivery member 172).

At block 1302, the method 1300 can include making a lateral incision. The lateral incision can be made on a posterolateral side (e.g., the posterolateral side 128) of an acromion bone (e.g., the acromion bone 102). The lateral incision can be made by, for example, a scalpel. The lateral incision may be a length of, for example, 2 cm.

At block 1304, the method 1300 includes splitting the lateral incision through a deltoid muscle. The deltoid muscle is attached to the acromion bone. The lateral incision is split for access to the acromion bone.

At block 1306, the method 1300 includes attaching to the acromion bone, a surgical apparatus (e.g., the surgical apparatus 100). The surgical apparatus can include a guide body (e.g., the guide body 106). The guide body can include a guide track (e.g., the guide track 122), a guide block (e.g., the guide block 126), a first supporting member (e.g., the first supporting member 130), a second supporting member (e.g., the second supporting member 132), and a third supporting member (e.g., the third supporting member 134). The surgical apparatus can also include a delivery member (e.g., the first delivery member 172). The first supporting member can engage with (e.g., attach to) an inferior portion (e.g., the inferior portion 136) of the acromion bone. The second supporting member can engage with a first superior portion (e.g., the first superior portion 138) of the acromion bone. The third supporting member can engage with a second superior portion (e.g., the second superior portion 140) of the acromion bone. In some embodiments, the surgical apparatus includes a second delivery member, and a drill bit is attached to the second delivery member following attachment of the supporting members.

At block 1308, the method 1300 includes drilling a cavity in a lateral portion (e.g., the lateral portion 174) of the acromion bone. The cavity can be drilled starting at the posterolateral side of the acromion bone. In some embodiments, prior to drilling the cavity, a guide rod (e.g., the guide rod 184) of the surgical apparatus is extended towards a scapula spine bone (e.g., the scapula spine bone 186). The guide rod can then be adjusted to contact skin above the scapula spine bone and align the surgical apparatus with, for example, the acromion bone. In some embodiments, a guide wire is inserted and drilled into the acromion bone towards the scapula spine bone prior to drilling the cavity.

At block 1310, the method 1300 includes inserting an implant (e.g., the implant 312) into the cavity via the delivery member. The implant can be inserted flush to the lateral portion of the acromion bone. In some embodiments, the implant is inserted around, over, and/or along the guide wire. In some embodiments, prior to inserting the implant, the implant is coupled to the second delivery member for insertion.

At block 1312, the surgical apparatus can be detached from the acromion bone. Once the implant is inserted, the first supporting member, the second supporting member, and the third supporting member can be detached from the acromion bone to detach the surgical apparatus. The delivery member is also withdrawn. In some embodiments, the guide wire is also withdrawn from the cavity following insertion of the implant.

While this specification contains many specific implementation details, these should not be construed as limitations on the scope of what can be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features can be described as acting in certain combinations and even initially claimed as such, one or more features from a claimed combination can, in some cases, be excised from the combination, and the claimed combination can be directed to a subcombination or variation of a subcombination.

As utilized herein, the terms "substantially," "generally," "approximately," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining can be stationary (e.g., permanent) or moveable (e.g., removable or releasable). Such joining can be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features can be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. can be either X, Y, Z, X and Y, X and Z, Y and Z, or X, Y, and Z (i.e., any combination of X, Y, and Z). Thus, such conjunctive language is not generally intended to imply that certain implementations require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A method, comprising:
   making a lateral incision on a posterolateral side of an acromion bone;
   splitting the lateral incision through a deltoid muscle;
   attaching to the acromion bone, a surgical apparatus comprising:
   a guide body comprising:
   a guide track,
   a guide block coupled to and movable along the guide track and defining an aperture,
   a first supporting member comprising one or more first engagement features, a second supporting member comprising one or more second engagement features, and a third supporting member comprising one or more third engagement features; and a delivery member extending through the aperture, the delivery member extending and movable along a delivery member axis extending above the first supporting member, wherein the first supporting member engages with an inferior portion of the acromion bone, the second supporting member engages with a first superior portion of the acromion bone, and the third supporting member engages with a second superior portion of the acromion bone;

drilling a cavity in a lateral portion of the acromion bone;

inserting an implant into the cavity via the delivery member, the implant flush to the lateral portion of the acromion bone; and detaching the surgical apparatus from the acromion bone.

2. The method of claim 1, further comprising:

extending a guide rod of the surgical apparatus towards a scapula spine bone; and adjusting the guide rod to contact skin above the scapula spine bone and align the surgical apparatus.

3. The method of claim 2, wherein the guide rod extends along a guide rod axis offset from the delivery member axis.

4. The method of claim 1, further comprising:

inserting a guide wire into the delivery member;

drilling the guide wire into the lateral portion of the acromion bone towards a scapula spine bone; and withdrawing the guide wire from the cavity following insertion of the implant;

wherein the cavity is drilled along the guide wire and the implant is inserted around the guide wire.

5. The method of claim 1, wherein to attach the surgical apparatus, the first supporting member is placed into contact with the inferior portion of the acromion bone, and the second supporting member and the third supporting member are adjusted to contact a posterior superior portion of the acromion bone and an anterior superior portion of the acromion bone, respectively.

6. The method of claim 5, wherein the second supporting member and the third supporting member are independently adjusted.

7. The method of claim 5, wherein the second supporting member and the third supporting member are coupled by a supporting member adjuster, the second supporting member and the third supporting member adjustable by the supporting member adjuster.

8. The method of claim 1, wherein to detach the surgical apparatus from the acromion bone, the delivery member is withdrawn and the second supporting member and the third supporting member are adjusted.

9. The method of claim 1, wherein the delivery member is a first delivery member and the surgical apparatus further comprises a second delivery member located within the first delivery member, the method further comprising:

attaching a drill bit to the second delivery member prior to drilling the cavity; and attaching the implant to the second delivery member prior to inserting the implant.

10. The method of claim 9, wherein to move the second delivery member and the first delivery member to insert the implant, the surgical apparatus further comprises a first handle to move the first delivery member and a second handle to move the second delivery member.

11. The method of claim 1, wherein the first superior portion of the acromion bone is a posterior superior lateral portion of the acromion bone and the second superior portion is an anterior superior central to central third portion of the acromion bone.

12. The method of claim 1, further comprising:

providing a material to the acromion bone to increase a calcium composition of the acromion bone.

13. The method of claim 12, wherein the material is part of the implant.

14. The method of claim 1, wherein the implant has a composition matching a composition of the acromion bone.

* * * * *